United States Patent
Bolte et al.

[11] Patent Number: 5,994,895
[45] Date of Patent: Nov. 30, 1999

[54] INDUCTIVE DISPLACEMENT SENSOR WITH SHORT-CIRCUIT RING OF NON-FERROUS MATERIAL

[75] Inventors: Heiko Bolte, Husum; Gerd Eden, Hage, both of Germany

[73] Assignee: WABCO GmbH, Hannover, Germany

[21] Appl. No.: 08/879,065

[22] Filed: Jun. 19, 1997

[30] Foreign Application Priority Data

Jun. 21, 1996 [DE] Germany .......................... 196 24 801

[51] Int. Cl.$^6$ .......................................... G01B 7/14
[52] U.S. Cl. ........................................ 324/207.16
[58] Field of Search .......................... 324/207.16, 224, 324/225, 654

[56] References Cited

U.S. PATENT DOCUMENTS 4,859,942  8/1989  Charton et al. .............. 324/207.16 X
5,302,894  4/1994  Hrubes ............................ 324/207.16

FOREIGN PATENT DOCUMENTS

| 04 04 534 A1 | 12/1990 | European Pat. Off. |
| 241 644 A1 | 12/1986 | Germany |
| 38 07 015 A1 | 11/1988 | Germany |
| 3722702 | 1/1989 | Germany |
| 42 08 367 A1 | 9/1993 | Germany |

*Primary Examiner*—Josie Ballato
*Assistant Examiner*—T. R. Sundaram
*Attorney, Agent, or Firm*—Proskauer Rose LLP

[57] ABSTRACT

An inductive displacement sensor comprises a magnetically conductive housing, a coil located within the conductive housing, and a solenoid plunger movable within the coil. A ring-shaped air gap is formed between the solenoid plunger and the conductive housing. A short-circuit ring surrounds the solenoid plunger and is located on the outside of the conductive housing and in front of the ring-shaped air gap. An electronic unit is connected to the coil that measures the displacement-dependent inductance of the coil.

5 Claims, 1 Drawing Sheet

INDUCTIVE DISPLACEMENT SENSOR WITH SHORT-CIRCUIT RING OF NON-FERROUS MATERIAL

FIELD OF THE INVENTION

The present invention relates to an inductive displacement sensor having a magnetically conductive housing, a coil located inside the housing and a solenoid plunger which can be pushed into the coil and forms a ring shaped air gap between the solenoid plunger and the housing.

BACKGROUND OF THE INVENTION

Displacement sensors of this type are used to detect displacement distances in machines or motor vehicles. A sensor using a solenoid plunger is a commonly used device for making these kind of measurements. With this kind of device, a magnetically conductive part, such as the solenoid plunger, is pushed into a coil. The solenoid plunger is connected to the part of a machine or motor vehicle whose displacement distance is to be measured. The inductance of the coil changes as a function of the displacement of the inserted solenoid plunger. Preferably, the inserted plunger is made of iron. This inductance change is evaluated by a suitable electronic system and is converted into a corresponding displacement distance. In order to increase the inductance and to insulate the sensor from outside interference, the coil is generally enclosed in a magnetically conductive housing. The magnetically conductive housing may be in the shape of a pot. In order to maintain the magnetic conductivity of the circuit at a high level, the air gap between the solenoid plunger and the housing is kept as small as possible.

The above-mentioned electronic system can use various techniques to evaluate the displacement-dependent inductance of the coil. For example, it is customary to subject the inductance of the coil to a voltage surge and then evaluate the resulting increasing current over time. The resulting increasing current is evaluated up to a set limit.

A displacement sensor which operates as described above is known in the art. For example, DE-A1 38 07 015 (U.S. Pat. No. 4,859,942) discloses a displacement sensor of this kind. An electronic evaluation circuit is also known from this patent document, which uses the variable inductivity of the coil to determine a displacement value.

A basic problem with all the known solenoid plunger displacement sensors is their sensitivity to outside interferences. This may cause the sensor to respond differently when it is installed in a machine or a motor vehicle, than when it is not installed.

Three different types of interferences may occur. First, static or changing magnetic interference fields may occur at the installation site. Second, iron parts may be installed at the installation site in the vicinity of the sensor which may influence the leakage field of the sensor and thereby may lower its measuring precision. Third, electrically conductive parts constructed of a metal other than iron that are located in the vicinity of the sensor may influence the measuring process due to their eddy current effects. In addition, this will also lower the precision of the displacement measurement.

SUMMARY OF THE INVENTION

It is the object of the present invention to develop a displacement sensor of the kind described above in such a manner that the sensitivity to outside interfering influences is reduced.

This object is attained by the inductive displacement sensor of the present invention. The inventive inductive displacement sensor comprises a magnetically conductive housing, a coil located within the conductive housing, and a solenoid plunger movable within the coil. A ring-shaped air gap is formed between the solenoid plunger and the conductive housing. A short-circuit ring surrounds the solenoid plunger and is located on the outside of the conductive housing and in front of the ring-shaped air gap. An electronic unit is connected to the coil that measures the displacement-dependent inductance of the coil.

The sensitivity to interfering fields or to external iron or metal parts is decreased by the short-circuit ring. This is due to the fact that the leakage field of the sensor, which forms due to the dynamic load on the coil during measuring and normally forms outside the sensor (See FIG. 2), is practically cut off by the presence of the short circuit ring. As a result, the inventive sensor does not respond differently based on its installation site.

From the above-mentioned DE-A1 38 07 015 (U.S. Pat. No. 4,859,942), a short-circuit ring is already known. However, the short circuit ring therein serves another purpose, i.e., the elimination of temperature influences on the measuring precision. For this reason the short-circuit ring disclosed therein is not located outside the housing or in front of the air gap as in the present invention, and does not prevent the formation of a leakage field.

A displacement sensor with a short circuit ring is also known from DD-A1 241 644. Here too the above mentioned short-circuit ring is not provided to keep out outside interfering fields, but is instead provided for the equalization of the sensor. Furthermore, it is located inside the housing.

BRIEF DESCRIPTION OF THE DRAWINGS

The invention is described in further detail below through the following drawings.

DETAILED DESCRIPTION

Figure 1:
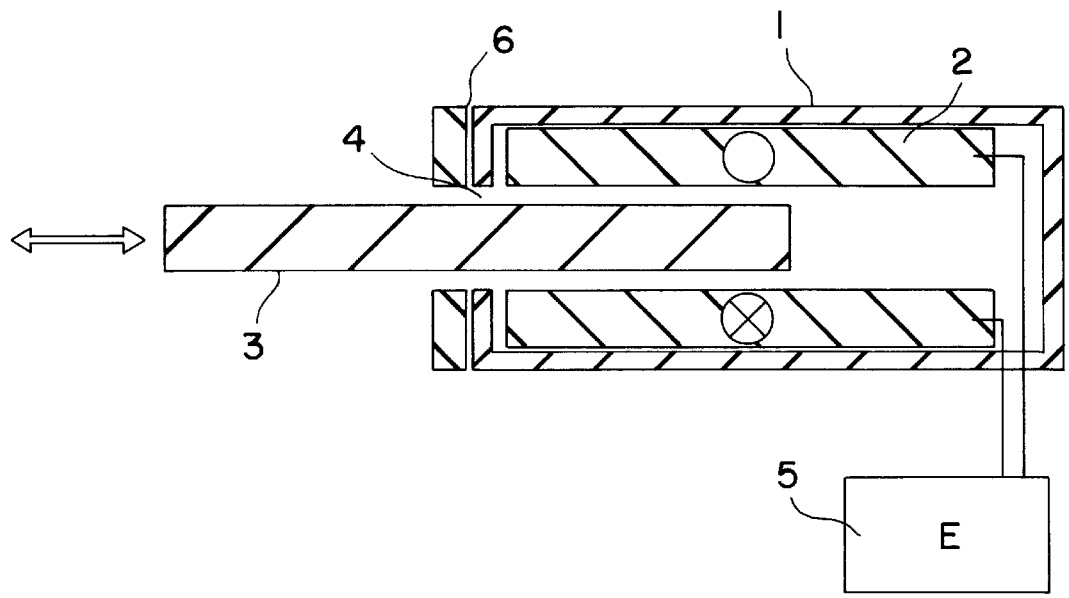
FIG. 1 shows a cross-section through a displacement sensor according to the invention.

The displacement sensor shown schematically in FIG. 1 comprises a magnetically conductive housing (1) in the shape of a pot, and a longitudinal coil (2) enclosed therein. The coil (2) can be further divided into individual compartments for the linearization of the output signal of the sensor, each compartment having a different number of windings (not shown). The ends of the coil (2) are connected to an electronic system (5) so that the displacement-dependent inductance of the coil can be measured. The electronic system (5) generally places a voltage surge at the coil and measures the rising coil current until a limit value has been reached. The time period from the beginning of the current rise until the current limit value has been reached is also measured.

A movable solenoid plunger (3) which can be pushed into the coil (2) is used for measuring the displacement. The deeper the plunger (3) is inserted into the coil (2), the higher the inductance of the coil (2). The magnetic circuit of the housing (1) and the plunger (3) are completed by an air gap (4). The air gap (4) is advantageously made very narrow. Preferably, the air gap (4) is less than about one millimeter.

Directly above the air gap (4), on the outside of the housing (1) or magnetic circuit, a short-circuit ring (6) which also surrounds the plunger (3) is attached to the housing (1). The short-circuit ring (6) is advantageously made of a highly electrically conductive, non-ferrous material, such as copper or aluminum.

The housing (1), as well as the solenoid plunger (3), are also advantageously made of a highly magnetically conductive material. Preferably, a highly permeable material, such as RNi5, is used, thereby keeping the magnetic field leakage that extends outside the housing (1) of the sensor, to a minimum.

The air gap (4) is advantageously less than about one millimeter.

Figure 2:
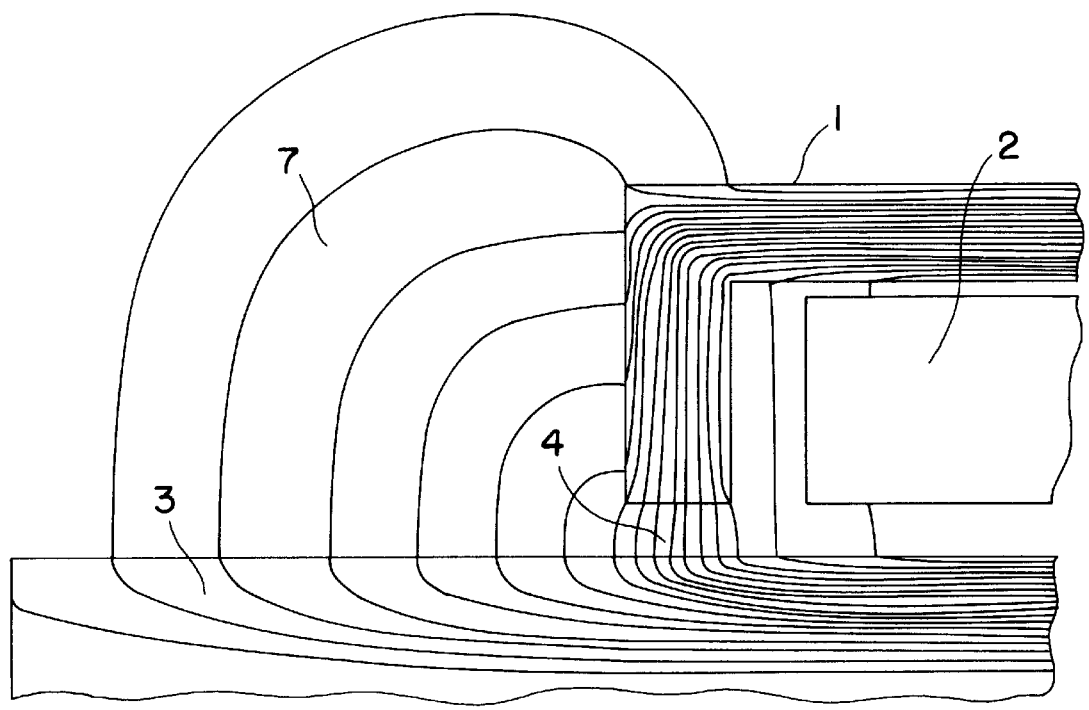
FIG. 2 is a schematic diagram of the magnetic field of a displacement sensor without a short-circuit ring.

FIG. 2 schematically shows the leakage field (7) that would occur for a displacement sensor without a short-circuit ring (6) according to the invention during a measurement operation. It can be seen that the magnetic field lines, caused in particular by the high magnetic resistance of the air gap (4), emerge from the housing (1) in an arc shape outside the sensor to the solenoid plunger (3).

It has been found that this leakage field (7) is the main cause of external interferences that influence the sensitivity of the known displacement sensors. The leakage field whose magnetic field lines are designated by (7) is affected by this external, interfering magnetic field and/or by external metal parts. Accordingly, the measuring precision of the known displacement sensors is dependent on its site of installation.

Due to the short-circuit ring being positioned according to the invention as shown in FIG. 1, the leakage field (7) shown in FIG. 2 is nearly eliminated. The magnetic field lines in the solenoid plunger (3) are "cut off" approximately directly in front of the air gap (4). This is because the current induced in the short-circuit ring (6) during operation of the displacement sensor produces a magnetic field that opposes the original magnetic field in the plunger, suppresses the field that emerges from the sensor (FIG. 1).

The principles of the present invention can be adjusted for use with all solenoid plunger displacement sensors, as well as with other magnetic sensors, the variable inductivity of which can be evaluated by excitation with a variable current.

While the invention has been described by reference to specific embodiments, this was for purposes of illustration only. Numerous alternative embodiments will be apparent to those skilled in the art and considered to within the scope of the invention.

We claim:

1. An inductive displacement sensor comprising:

a magnetically conductive housing;

a coil located within said conductive housing;

a solenoid plunger moveable within said coil;

a ring-shaped air gap between said solenoid plunger and said conductive housing;

a short-circuit ring, made from a highly electrically conductive non-ferrous material surrounding said solenoid plunger for suppressing magnetic fields generated by said solenoid plunger, said short-circuit ring being located outside said conductive housing and in front of said ring-shaped air gap; and an electronic system connected to said coil which measures the displacement-dependent inductance of said coil.

2. The inductive displacement sensor of claim 1, wherein said conductive housing is made from a highly permeable material.

3. The inductive displacement sensor of claim 2, wherein said solenoid plunger is made from a highly permeable material.

4. The inductive displacement sensor of claim 1 wherein said short-circuit ring is made from copper or aluminum.

5. The inductive displacement sensor of claim 1 wherein said air gap is less than about 1 mm.

* * * * *